Patented Sept. 14, 1954

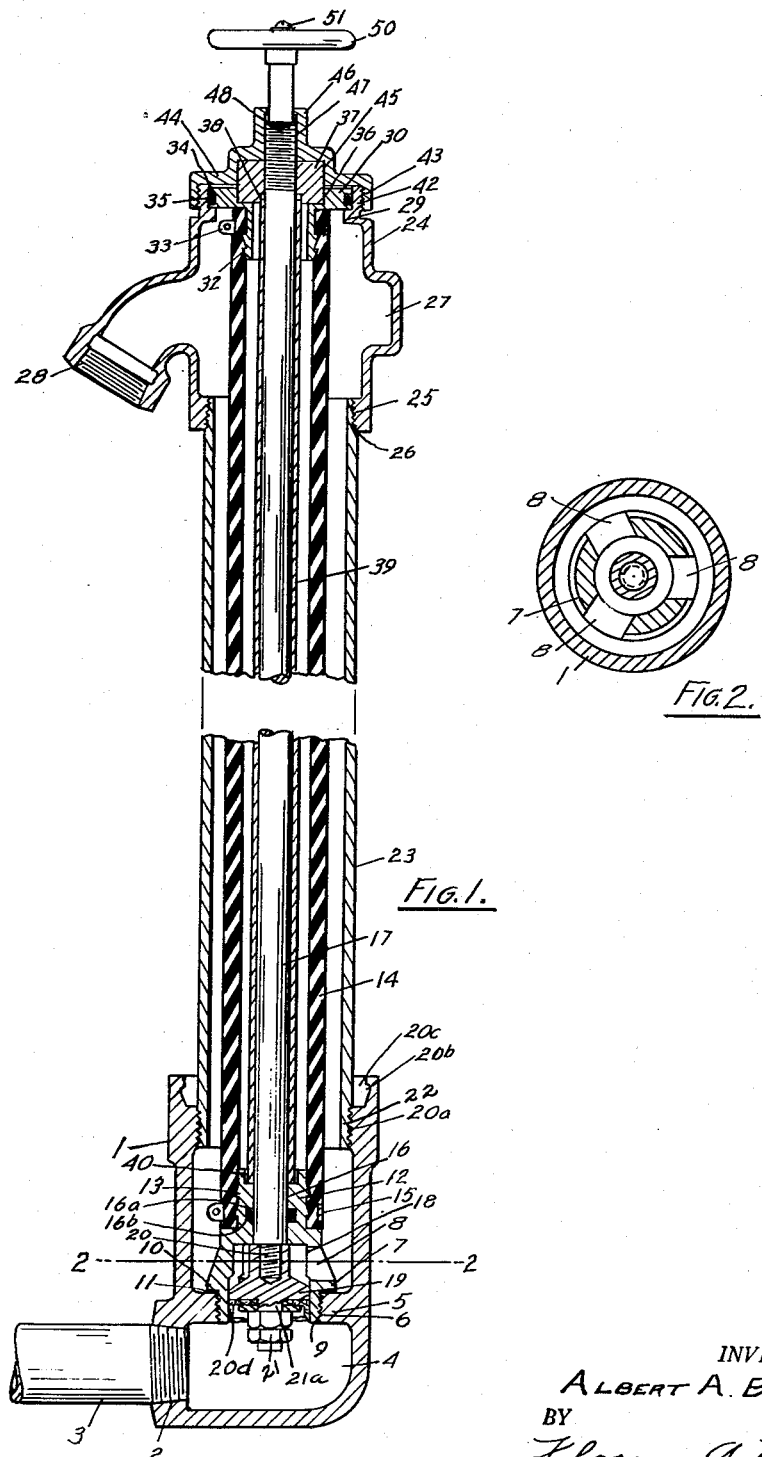

2,688,976

UNITED STATES PATENT OFFICE 2,688,976

NONFREEZING HYDRANT

Albert A. Baker, Erie, Pa., assignor to J. A. Zurn Mfg. Co., Erie, Pa., a corporation of Pennsylvania Application January 15, 1951, Serial No. 206,080

4 Claims. (Cl. 137—284)

This invention relates generally to hydrants and more particularly to non-freezing hydrants.

Hydrants made in accordance with the teachings of the prior art, and with which I am familiar, require openings in the valve housing or stand pipe below the frost line to drain water from the stand pipe above the frost line to prevent freezing. These drain openings below the frost line heretofore permitted pollution and contamination of the water in the hydrant with the result that many health authorities would not allow the use of a non-freezing hydrant. Many of these prior hydrants require an air chamber or some other similar form of device to absorb the shocks caused by water hammer. The quick closing of compression type valves which were heretofore used many times caused water hammer severe enough to damage the hydrant and the supply pipe. It has also been necessary in these prior non-freezing hydrants to remove the entire stand pipe and valve housing from the ground to remove and repair the valve. Hydrants have been designed with rubber tubes leading to the spout wherein the flow of water was through the rubber tube disposed centrally of the stand pipe and extending to the spout. In these devices, freezing of the water would cause the ice to expand the tube outwardly, thereby making the flow therethrough almost impossible after any severe freeze. Even in normal operation with these prior devices, the flow through the tube was greatly restricted because of the comparatively small cross sectional area of the rubber tube, particularly at the outlet. It is necessary to bend the prior rubber tubes through the outer end of the spout, thereby usually making more than a right angled turn and flattening out a portion of the tube which further restricts the flow in these prior devices. Furthermore, it is practically impossible for the ice to move upwardly and outwardly in prior rubber tubes, thereby causing bursting in many instances.

It is, accordingly, an object of my invention to overcome the above and other defects in non-freezing hydrants and it is more particularly an object of my invention to provide a non-freezing hydrant which is simple in construction, economical in cost, economical in manufacture, and efficient in operation.

Another object of my invention is to provide a non-freezing hydrant wherein the valve and other parts of the hydrant may be removed from above ground without removing the stand pipe or valve housing below the frost line.

Another object of my invention is to provide a non-freezing hydrant which is sealed and, therefore, the water passing therethrough is not polluted from underground water, especially when the hydrant is installed near a sewer line or in porous soil.

Another object of my invention is to provide a novel pressure sealing valve for a non-freezing hydrant which eliminates water hammer and any requirement for shock absorbers in the line to prevent damage.

Another object of my invention is to provide novel means for securing a valve in a housing and for supporting the valve stem in a non-freezing hydrant.

Another object of my invention is to provide a novel rubber sleeve for disposal in the stand pipe of a non-freezing hydrant whereby water flows around the outer side thereof to the spout on the upper end of the stand pipe.

Another object of my invention is to provide a novel spout member on the upper end of a hydrant which permits maximum freezing of the water in the stand pipe without the bursting thereof.

Another object of my invention is to provide a novel valve for a non-freezing hydrant which controls the flow of fluid therethrough.

Another object of my invention is to provide a novel non-freezing hydrant with a rubber sleeve wherein the spout on the upper end of the hydrant has a full open area and the rubber sleeve extends upwardly beyond the spout so that it is adjacent thereto to prevent any bursting of the spout member on the upper end of the hydrant.

Another object of my invention is to provide a novel combination and arrangement of parts and elements in a non-freezing hydrant which makes it simple to maintain and operate and which permits maximum flow of fluid through the hydrant.

Other objects of my invention will become evident from the following detailed description, taken in conjunction with the accompanying drawings, in which Fig. 1 is a vertical sectional view of my non-freezing hydrant; and Fig. 2 is a view taken on the line 2—2 of Fig. 1.

Referring now to the drawings, I show in Figs. 1 and 2 a non-freezing hydrant comprising a housing 1 for disposal below the frost line of the earth. The housing 1 has a laterally extending threaded aperture 2 in the lower end thereof for threadable engagement with the threaded end of a pipe line 3 for supply water. A chamber 4 is formed in the lower end of the housing 1 by an intermediate transverse wall 5 having an internally threaded aperture 6. A flanged valve casing 7 has laterally extending openings 8 for the flow of water, a threaded portion 9 for threadable engagement with the threaded aperture 6 in the wall 5, an outwardly directed flange 10 for seating on a washer 11 on the wall 5, and a reduced upper end 12 having serrations 13 for receiving a flexible sleeve 14, preferably made of rubber. A clamp 15 clamps the sleeve 14 to the serrated periphery 13 of the upper end 12 of the valve casing 7. The upper end 12 of the casing 7 has a bore 16 for receiving a valve rod 17 and the lower end of the housing 7 has an enlarged bore 18 for receiving a reciprocating conical shaped valve head 19. The rod 17 has a reduced threaded lower end 20 for carrying the valve head 19. The valve head 19 has an internally threaded portion for threadable connection with the threaded end 20 of the rod 17. A cup shaped sealing washer 20d is secured to the threaded shaft 21a on the valve head 19 by a nut and washer assembly 21. An internal washer groove 16a has a ring washer 16b therein for sealingly engaging the rod 17.

The upper end of the housing 1 is internally threaded at 20a for threadable engagement with the lower threaded end 22 of a stand pipe or riser 23. The upper end of the housing 1 also has an annular groove 20b for receiving a caulking material 20c, thus providing a threaded connection and a caulked connection between the riser 23 and the housing 1. This is a safety precaution inasmuch as the prior underground threaded connections corrode and lock when they are in the ground any appreciable length of time. A head 24 is internally threaded on the lower end thereof at 25 for threadable engagement with the upper threaded end 26 of the stand pipe 23. The periphery of the head 24 is bulged out forming a peripheral groove 27 to strengthen the head 24 and permit greater expansion of ice therein. The head 24 also has a spout 28 extending laterally therefrom. The upper end of the head 24 has an inwardly extending flange 29 seating a circular member 30 having a depending serrated portion 32 for receiving the upper end of the sleeve 14. A clamp 33 clamps the upper end of the sleeve 14 to the depending portion 32 of the member 30. The member 30 has a peripheral groove 34 for receiving a ring washer 35 to seal the upper end of the head 24. The member 30 also has a centrally disposed counterbore 36 for seating a cylindrical member 37, the cylindrical member 37 having a counterbore 38 for receiving the upper end of a supporting sleeve 39, the lower end of which is seated in the counterbore 40 in the upper end 12 of the casing 7. The upper end of the head 24 is externally threaded at 42 to threadably engage the internally threaded portion 43 of a flanged cap member 44. The cap member 44 has a recessed portion 45 for nesting the upper end of the cylindrical member 37 and holding it against lateral and longitudinal movement. The cap 44 has an upwardly extending hollow stem 46 internally threaded at 47 for threadably engaging the threaded portion 48 of the valve rod 17. A handle 50 is secured to the upper end of the valve rod 17 by a washer and screw assembly 51.

In operation, the housing 1 is disposed well below the frost line in accordance with the particular geographical area where the hydrant is installed. When the valve is closed as shown in Fig. 1, water will freeze in the riser 23 and the head 24 above the frost line of the earth. The water flows around the outer side of the rubber sleeve 14 between the rubber sleeve 14 and the inside of the riser 23. This gives a relatively large area for the flow of water. As the water freezes, the pressure of the ice formed forces the rubber sleeve 14 inwardly, thus permitting a relatively large increase in the area occupied by the water without bursting the pipe. The relative diameter of the riser 23 and the sleeve 14 is so designed that there will be no bursting of the riser 23 or head 24 upon changing of the water therein to ice. The head 24 is grooved at 27 to permit greater expansion of the ice therein and to strengthen the head so that it will not be burst by ice. The open spout 28 permits ice to be forced therethrough in that the full flow opening is available. The head 24 does not burst because the sleeve 14 extends well above the spout 28 to permit expansion of the ice in the head 24. The flexible sleeve 14 is enclosed so that it is fully protected from the weather. The combined threaded and caulking connection between the housing 1 and the riser 23 is particularly important because it is an underground connection and in prior instances, it has been found that there is corrosion between the threaded connections and they become locked and it is impossible to disconnect the riser from the valve casing. By rotating the handle 50 clockwise, the threaded connection between the valve rod 17 and the threaded portion 47 of the stem 46 of the cap 44 causes longitudinal downward movement of the valve rod 17, thereby moving the conical valve head 19 from the bore 18 in the member 7, thereby permitting the flow of water from the supply pipe 3 to the chamber 4 and through the casing 7 and the riser 23 on the outer side of the sleeve 14 to the head 24 and spout 28. Where ice is formed between the sleeve 14 and the riser 23, the sleeve 14 will be further contracted by the incoming water and the water will move up past the inner side of the ice whereby it will be broken up and/or melted and forced out of the spout 28 in comparatively small pieces. This takes place in a very short time so that the hydrant is free of ice and the water flows through the hydrant within a very short time. The conical shape of the valve head permits gradual opening and closing of the valve, thus preventing water hammer. It also permits flow control of the water through the hydrant.

It will be observed that the tubular support member 39 is seated and supported on both ends in counterbores so that no threaded connections are necessary to secure same. Furthermore, it is easily removed by removing the cap 44. The support member 39 gives support to the valve rod 17 so that there is no bending thereof out of alignment to make turning thereof more difficult.

It will be evident from the foregoing description that I have provided a non-freezing hydrant which is completely sealed, thereby making it completely sanitary, which permits freezing of the water in the hydrant without bursting or damaging any of the parts thereof, which provides support for the valve rod, which permits easy removal and replacement of the rubber sleeve and the connections therefor from the top of the hydrant above the ground, which has a combined threaded and caulked connection between the riser and the housing below the frost line of the earth, which has a novel valve which eliminates water hammer and permits the control of the flow of water through the hydrant, and which has a novel combination and arrangement of parts, making it easy to assemble and disassemble and replace any of the parts thereof.

Various changes may be made in the specific embodiment of my invention without departing from the spirit thereof or from the scope of the appended claims.

What I claim is:

1. A non-freezing hydrant comprising a housing for disposal below the frost line of the earth, a water supply pipe attached to said housing, a riser attached to said housing extending upwardly therefrom, an open head attached to the upper end of said riser having a laterally extending spout, a valve casing fixed in said housing and having an axially extending bore, a conical shaped valve movable into and out of said bore of said valve casing, a valve rod attached to said valve and extending upwardly through said riser and open head, means for moving said valve rod and valve longitudinally, an elastic sleeve concentrically disposed on said valve rod and in spaced relation to said rod and to said riser and disposed in said riser, means for securing the lower end of said sleeve to said valve casing, a circular member in the upper end of said open head having means for attaching the upper end of said elastic sleeve thereto, means to hold said circular member in spaced relation to said valve, a cap disposed on said head for supporting said circular member in said riser, and means for directing the flow of water through said riser to said spout in said head on the outer side of said elastic sleeve, said valve casing, valve, said valve rod, and elastic sleeve being removable as a unit upon removal of the cap from said head and said valve casing from said housing.

2. The non-freezing hydrant recited in claim 1 wherein said means for holding said circular member in spaced relation to said valve comprises a supporting sleeve disposed concentric to said valve rod and in spaced relation to said elastic sleeve.

3. A non-freezing hydrant comprising a housing for disposal below the frost line of the earth, a riser attached to said housing, a head attached to said riser and having a spout, a valve casing having a bore therethrough in said housing and fixed thereto, a valve movable into and out of the bore in said valve casing, a valve rod extending upwardly through said riser and attached to said valve, a rubber sleeve attached to said valve casing and to said head concentric to said valve rod and spaced from the outer side of said riser and from said valve rod to provide a path for water to flow between said rubber sleeve and said riser to said spout from said housing, said sleeve being disposed concentric to said valve rod, sealing means in said casing and around said valve rod to prevent water from flowing between said rubber sleeve and said valve rod, and means on the upper end of said valve rod for moving said valve head longitudinally from the upper end of said hydrant above the earth.

4. The non-freezing hydrant recited in claim 3 wherein said valve is conical shaped and has a cup shaped sealing washer attached thereto and movable therewith.

References Cited in the file of this patent

UNITED STATES PATENTS

| Number | Name | Date |
|---|---|---|
| 21,858 | Swan | Oct. 19, 1858 |
| 196,384 | Porteous | Oct. 23, 1877 |
| 259,256 | Withey | June 6, 1882 |
| 726,369 | Sullivan | Apr. 28, 1903 |
| 998,782 | Lake | July 25, 1911 |
| 1,083,291 | Muller | Jan. 6, 1914 |
| 1,197,583 | Sheridan | Sept. 5, 1916 |
| 1,278,487 | Lofton | Sept. 10, 1918 |
| 1,349,062 | Goldburg | Aug. 10, 1920 |
| 1,562,223 | Gannestad | Nov. 17, 1925 |
| 1,572,033 | Parker | Feb. 9, 1926 |
| 2,099,928 | Doppelhammer | Nov. 23, 1937 |
| 2,109,187 | Vogel | Feb. 22, 1938 |
| 2,200,770 | Burdick | May 14, 1940 |
| 2,532,995 | Chausse | Dec. 5, 1950 |

FOREIGN PATENTS

| Number | Country | Date |
|---|---|---|
| 10,030 | Great Britain | 1897 |
| 195,647 | Great Britain | Sept. 13, 1923 |